United States Patent
Gaudreau et al.

[15] 3,680,629
[45] Aug. 1, 1972

[54] APPARATUS FOR MOLDING AND CURING FOAMED ARTICLES

[72] Inventors: Laurent R. Gaudreau, Somersworth; Floyd E. McDowell, Exeter, both of N.H.

[73] Assignee: McCord Corporation, Detroit, Mich.

[22] Filed: Dec. 12, 1969

[21] Appl. No.: 884,656

[52] U.S. Cl. ................................. 165/26, 165/48
[51] Int. Cl. ................................. F25b 29/00
[58] Field of Search ........ 165/22, 26, 50, 48, 61, 168, 165/12

[56] References Cited

UNITED STATES PATENTS

| | | | |
|---|---|---|---|
| 1,571,929 | 2/1926 | Bronander | 165/168 |
| 2,632,207 | 3/1953 | Mahla | 165/12 |
| 3,259,175 | 7/1966 | Kraus et al. | 165/48 |
| 3,525,098 | 8/1970 | Vox | 165/48 |

*Primary Examiner*—Charles Sukalo
*Attorney*—McGlynn, Reising, Milton & Ethington

[57] ABSTRACT

An apparatus for molding and curing flexible foam. The apparatus includes a mold having base and lid sections, the latter when in the closed condition cooperating with the base section to enclose a mold cavity. Heat transfer coils are embedded in the base and lid sections, and inlet and exhaust manifolds interconnect opposite ends of the embedded coils. The inlet manifold is connected to independent sources of heating and cooling fluid, and the exhaust manifold is connected to a drain. Valves between the inlet manifold and the sources of heating and cooling fluids, as well as between the exhaust manifold and the drain, control the alternate flow of heating and cooling fluid through the heat transfer coils.

4 Claims, 6 Drawing Figures

PATENTED AUG 1 1972

INVENTORS
LAURENT R. GAUDREAU
FLOYD E. McDOWELL

BY Chittick, Pfund, Birch, Samuels & Gauthier

ATTORNEYS

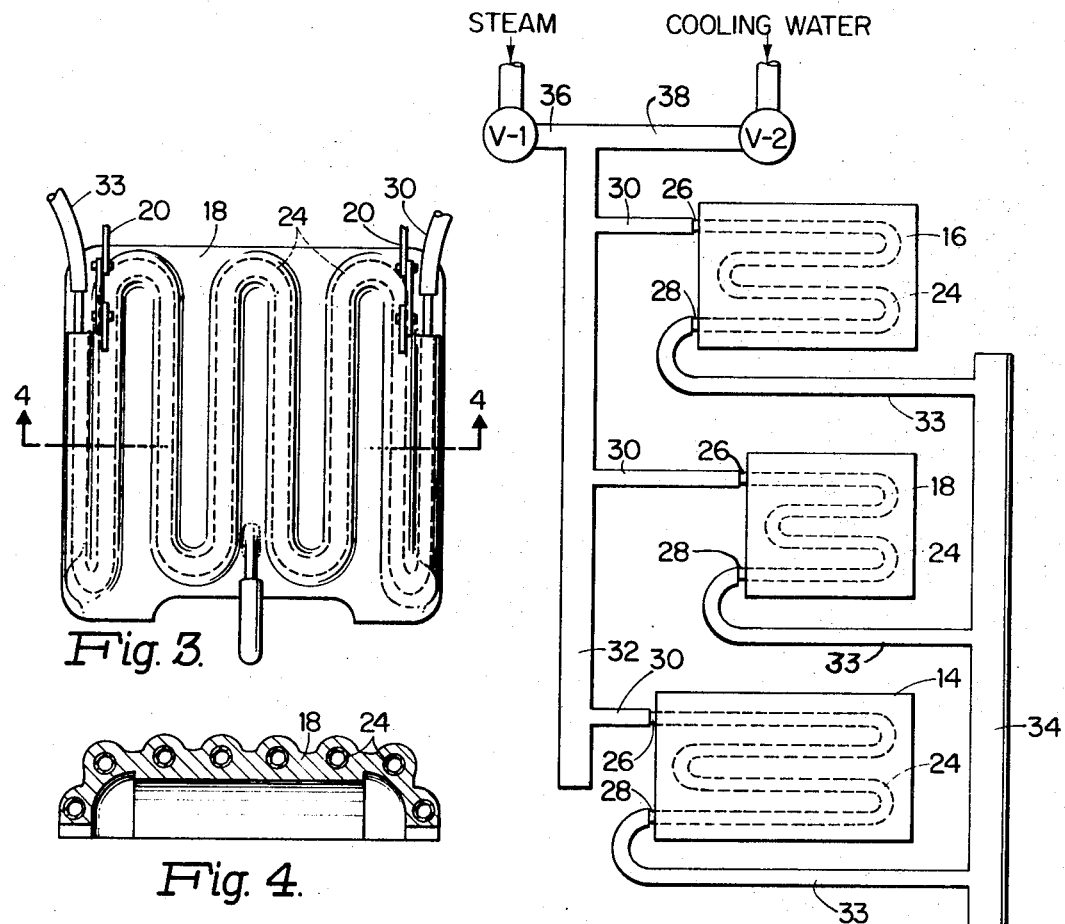
Fig. 3.
Fig. 4.
Fig. 5.
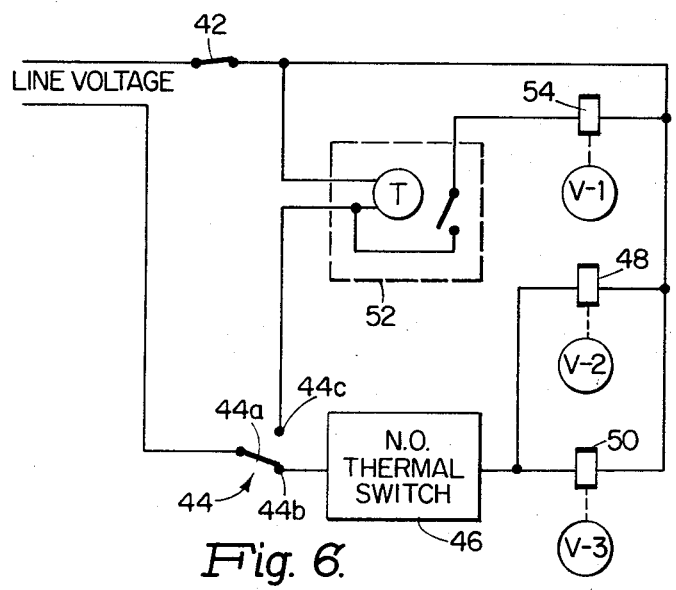
Fig. 6.

APPARATUS FOR MOLDING AND CURING FOAMED ARTICLES

DESCRIPTION OF THE INVENTION

This invention relates generally to an apparatus for molding and curing flexible foams.

Two techniques have traditionally been employed in the molding and curing of flexible foams, particularly those of the urethane class. The first of these techniques involves the use of relatively thin-walled molds which are charged with a metered amount of foam forming ingredient and thereafter run through a curing oven on a conveyor. These molds are subsequently cooled by spraying their exterior surfaces with cooling water or other known liquid coolants. The other technique involves the use of stationary molds which have hollow or jacketed walls through which heating and cooling mediums are alternately circulated. Experience has indicated that the efficiency of these techniques is diminished by a number of drawbacks. One such drawback lies in the inability of these techniques to uniformly cure complicated parts, particularly those having lips, undercuts, hollows, etc. The difficulty in this respect lies in getting enough heat to certain mold areas without overheating others. More particularly, where thin-walled molds are heated in curing ovens, it is frequently difficult to obtain sufficient air flow to the mold hollows and undercuts. A similar problem exists in jacketed molds, because it is difficult if not impossible to extend the jacketed construction into areas adjacent lips, undercuts, etc. The lengthy time cycles of these techniques also limits their rate of production and this represents another significant drawback where high volume production is economically desirable.

The present invention offers a solution to the foregoing problems and has as one of its objectives the provision of an improved means for heating and cooling complicated molds. This is accomplished by embedding heat transfer coils in the mold walls. The embedded coils are suitably arranged and dimensioned to alternately conduct heating and cooling mediums to all parts of the mold, including those remote areas which have heretofore been difficult to reach with conventional techniques, thereby insuring substantially uniform curing of the part being molded.

A further object of the present invention is to substantially shorten the molding cycle, particularly that portion of the cycle devoted to heating and cooling the mold walls.

These and other objects and advantages of the present invention will become more apparent as the description proceeds with the aid of the accompanying drawings, wherein;

FIG. 3 is a plan view of one of the lid sections of the mold assembly;

FIG. 4 is a sectional view taken along line 4—4 of FIG. 3;

FIG. 5 is a schematic illustration showing the piping arrangement employed to conduct heating and cooling fluids through the coils embedded in the base and lid sections of the mold; and FIG. 6 is a schematic illustration showing a preferred control system.

Figure 1:
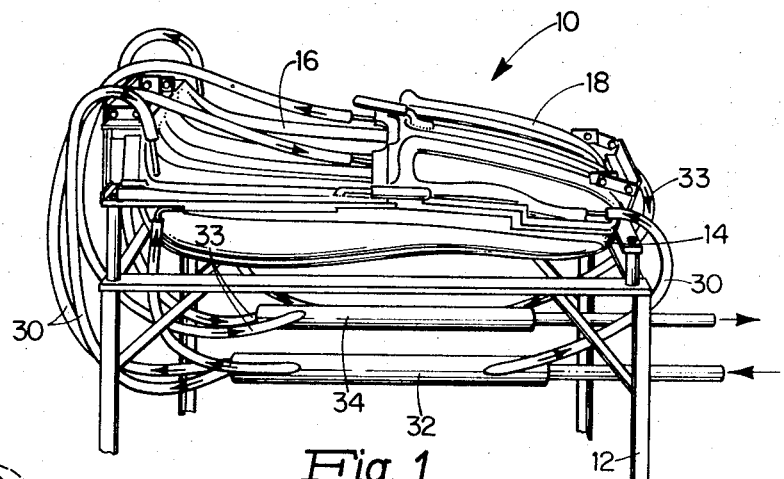
FIG. 1 is a view in perspective of one embodiment of a mold embodying the concepts of the present invention, with the lid sections in the closed position.
Figure 2:
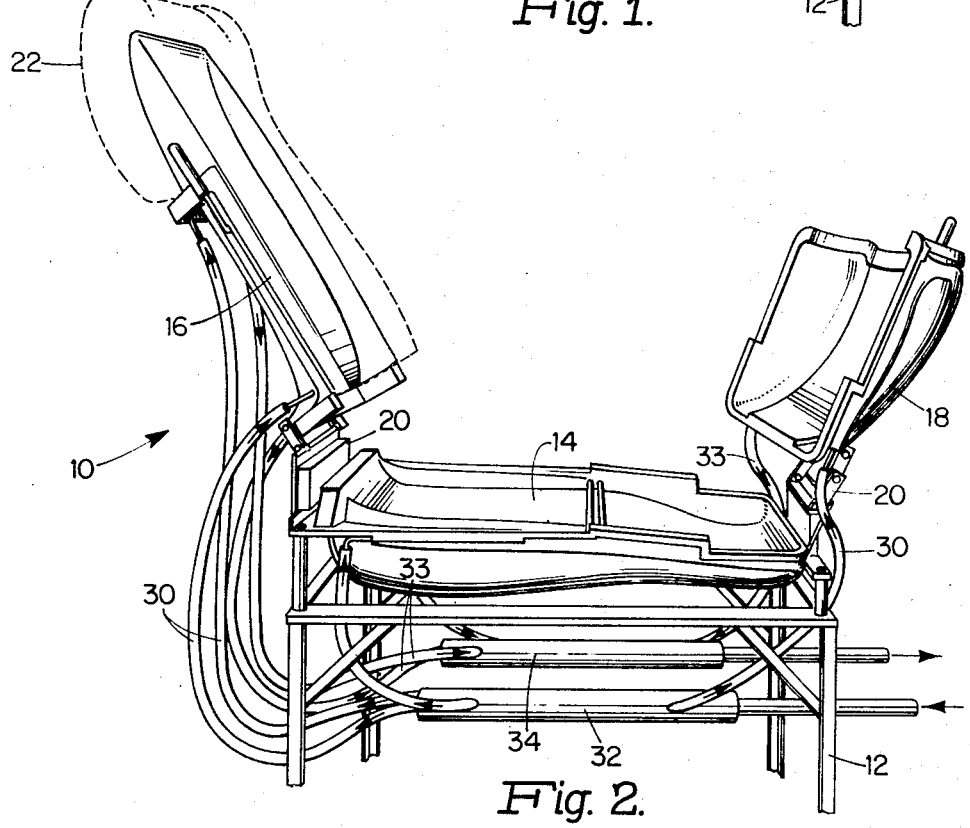
FIG. 2 is another perspective view of the apparatus shown in FIG. 1, with the lid sections in the open position.

Referring initially to FIGS. 1 and 2, there is shown at 10 one embodiment of a mold assembly constructed in accordance with the present invention. Mold assembly 10 is supported by any convenient means, such as for example by a suitably designed frame 12. The mold assembly includes a stationary base section 14 with lid sections 16 and 18 pivotally mounted on the base section 14 by means of hinge assemblies 20. The lid sections are movable between open positions as shown in FIG. 2 and closed positions cooperating with the base section 14 to define a mold cavity, as shown in FIG. 1.

The above-described mold is specially designed to produce an automobile back and head rest assembly of the type shown in dotted at 22 in FIG. 2. It will, however, be understood that this particular mold design is employed herein for illustrative purposes only, and is not to be considered as a limitation upon the scope of the invention.

The means for heating and cooling the mold sections 14, 16 and 18 will now be described with further reference to FIGS. 3–6. As is schematically depicted in FIG. 5, each mold section has embedded therein a heat transfer coil 24 having inlet and outlet ends 26 and 28. The coils may be shaped to any desired configuration prior to being embedded in the mold sections. The coils may for example comprise stainless steel tubing and the mold sections may be cast of aluminum.

The inlet ends 26 of the heat transfer coils are connected via intermediate conduits 30 to an inlet manifold 32. Similarly, the outlet ends 28 of the coils are connected via intermediate conduits 33 to a common exhaust manifold 34. Where the mold sections are movable, as in the case of the lid sections 16 and 18, the intermediate conduits 30 and 33 are preferably made up of flexible high pressure hose.

A typical mold section is shown in FIGS. 3 and 4 wherein it will be seen that the embedded coil 24 is shaped in a generally serpentine configuration to insure adequate heat transfer at all points of the mold section. In this embodiment, the heat transfer coil is completely embedded in and surrounded by the mold. It will, however, be appreciated that alternatively, the coil might only be partially embedded or perhaps attached as by spot welding to the exterior surfaces of the mold section. The important concept to keep in mind is that the coils are affixed to the mold sections in a manner which will accommodate the desired heat transfer between the fluid circulating through the coils and the mold sections. Thus as hereinafter employed, particularly in the claims appended hereto, it will be understood that the term "affixed to a heat conductive relationship" is intended to cover embodiments where the coils are attached to the surfaces of the mold sections, or partially or completely embedded in the walls of the mold sections.

With reference to FIG. 5, it will be seen that the inlet manifold 32 is connected by branch lines 38 and 38 to separate sources of heating and cooling fluids, for example, high pressure steam and cooling water. Solenoid actuated globe valves V–1 and V–2 are located respectively in the branch lines 36 and 38. A steam trap T is located at the outlet end of exhaust manifold 34. The trap empties into a drain and is by-passed by another line 40 having a third control valve V-3 located therein. The control valves V-1, V-2 and V-3 are all normally closed.

The control circuit for the above described piping arrangement is schematically depicted in FIG. 6. The circuit is energized by a main switch 42 and adjusted to either a "cool" or "heat" condition by means of a single pole double throw switch 44. When the pole 44a of switch 44 is in the illustrated condition contacting contact 44b, the circuit is in the "cool" condition. This energizes a normally open thermal switch 46 which is closed by a temperature rise in the mold sections. When switch 46 is closed, solenoids 48 and 50 are energized to open normally closed control valves V-2 and V-3. This causes cooling water to enter inlet manifold 32 where it is directed by intermediate conduits 30 into the heat transfer coils 24. The cooling water exits from the heat transfer coils through intermediate conduits 33 and continues to flow through exhaust manifold 34, line 40 and open control valve V-3 to the drain. The cooling water will continue to flow through the heat transfer coils until the thermal switch 46 is opened due to a sufficient reduction in mold temperature. Alternatively, the flow of cooling water might be arrested by adjusting switch 44 to the "heat" condition with pole 44a contacting contact 44c. Under this condition, valves V-2 and V-3 close immediately, and a time delay switch 52 is energized. Following the expiration of a predetermined time interval, the latter being adjustable to suit varying operating conditions, switch 52 is closed to energize solenoid 54. This opens control valve V-1 and allows steam to enter inlet manifold 32. The steam flows through the heat transfer coils, with any resulting steam condensate being drained through exhaust manifold 34 and steam trap T to the drain. The switch 52 maintains valve V-1 in the open condition for a predetermined period which is adjustable to insure adequate curing of the molded part. The switch 52 then opens automatically to terminate the curing cycle.

The above described apparatus is operated in the following manner: beginning at the stage when the curing of a molded part has been completed, the mold is opened (see FIG. 2) and the finished part 22 is removed. Thereafter, the interior mold surfaces may if desired by sprayed with a mold release prior to cooling the mold down to a lower suitable temperature for pouring the next metered shot. Cooling is accomplished by simply adjusting switch 44 to the "cool" position to circulate cooling water through the heat transfer coils. After the mold has been cooled sufficiently, a meter amount of foam forming ingredient is poured into the base section 14, the lid sections 16 and 18 are closed (see FIG. 1) and switch 44 is adjusted to the "heat" position. This energizes time delay switch 52 and simultaneously closes control valves V-2 and V-3. Switch 52 is set to delay energization of solenoid 54 for a period of time sufficient to allow the foam forming ingredient to expand and completely fill the mold cavity. When the preset delay has expired, solenoid 54 is energized to open valve $V_1$, thus beginning the heating cycle. The incoming steam drives any cooling water remaining in the coils and exhaust manifold 34 out through the steam trap T. This cycle will continue until the foamed part has been completely cured, at which point switch 52 will open automatically.

A number of advantages are made possible by the foregoing arrangement. For example, the use of heat transfer coils enables rapid and efficient heat transfer, and makes possible the use of high pressure steam. No time is lost in draining cooling water from the coils, because any residual cooling water is immediately exhausted through the steam trap T along with the steam condensate. The use of heat transfer coils provides flexibility in mold design and adaptability of the apparatus to complicated parts. More uniform heating and cooling results, thereby minimizing the number of parts which might otherwise be spoiled due either to excessive or insufficient curing.

It is our intention to cover all changes and modifications of the embodiment herein chosen for purposes of disclosure which do not depart from the spirit and scope of the invention as defined by the claims appended hereto.

We claim:

1. For use with a flexible foam molding apparatus of the type having base and lid components cooperating to enclose a mold cavity, means for alternately heating and cooling said base and lid components during the molding cycle, said means comprising heat transfer coils embedded in said base and lid components; inlet and exhaust manifolds interconnecting opposite ends of said coils; a source of steam and a source of cooling water connected to said inlet manifold; a drain connected to said exhaust manifold; a steam trap between said exhaust manifold and said drain; a first valve between said inlet manifold and said steam source; a second valve between said inlet manifold and said cooling water source; a third valve located in a conduit which extends from said exhaust manifold and by-passes said steam trap; and control means for controlling the operation of said valves to produce alternate flow of steam and cooling water through said manifolds and coils.

2. The apparatus as claimed in claim 1 wherein said control means includes an electrical cooling circuit controlling the operation of said second and third valves, said cooling circuit including a normally open thermal switch to maintain said second and third valves in the open condition until said base and lid components have been cooled sufficiently.

3. The apparatus as claimed in claim 2 wherein said control means further includes an electrical heating circuit controlling the operation of said first valve, with switch means for alternately energizing said heating and cooling circuits, and a timing mechanism in said heating circuit for delaying the opening of said first valve for a predetermined time following energization of said heating circuit, said timing mechanism thereafter being operable to close said first valve after a further period has elapsed.

4. Apparatus for molding and curing flexible foam comprising: a mold having base means and lid means, said lid means being movable between an open position and a closed position cooperating with said base means to enclose a mold cavity; heat transfer coils embedded in said base and lid means; an inlet manifold interconnecting the inlet ends of said coils; an exhaust manifold interconnecting the outlet ends of said coils; a steam source and water coolant source connected to said inlet manifold; first valve means between said steam source and said inlet manifold; second valve means between said water coolant source and said inlet manifold; a drain for receiving cooling water and steam condensate from said exhaust manifold; a steam trap between said exhaust manifold and said drain; conduit means bypassing said steam trap and extending between said exhaust manifold and said drain; a third valve means in said conduit means; and control means for operating said valve means to alternately cool and heat said mold by alternately circulating cooling water and steam through said coils, said control means including a switch and timer means to open said first valve only after a period sufficient to allow foam forming ingredient in the mold to expand and completely fill the mold cavity to thereby form a foamed part and to thereafter close said first valve only after a period sufficient to allow complete curing of the foamed part.

* * * * *